Nov. 19, 1957 L. W. MACOMBER 2,813,503
INDICATOR FOR HAND LOOMS FOR WEAVING
Filed Jan. 30, 1956 2 Sheets-Sheet 1

INVENTOR.
LEROY W. MACOMBER
BY
John A. McManus
ATTORNEY

Nov. 19, 1957 L. W. MACOMBER 2,813,503
INDICATOR FOR HAND LOOMS FOR WEAVING
Filed Jan. 30, 1956 2 Sheets-Sheet 2

INVENTOR.
LEROY W. MACOMBER
BY John A. McManus
ATTORNEY

United States Patent Office 2,813,503
Patented Nov. 19, 1957

2,813,503

INDICATOR FOR HAND LOOMS FOR WEAVING

Leroy W. Macomber, Saugus, Mass.

Application January 30, 1956, Serial No. 562,232

2 Claims. (Cl. 116—133)

The present invention relates to an indicator for hand looms for weaving, and more specifically to means for indicating the pedal sequence in weaving and the harness sequence in threading the warp threads through the heddles. A type of hand loom referred to is illustrated and described in my copending patent application, Serial No. 487,388, filed February 10, 1955, now U. S. Patent No. 2,803,267.

The object of my invention is to employ such an indicator to assist the operator in the manipulation and sequence of operations of particular pedals and harnesses, suitable indicia designating the desired sequence of operations being inscribed (preferably in pencil) on the indicator dial.

Another object of my invention is to utilize such an indicator to guide the operator in varying the sequence of operations in weaving, and threading the harnesses, the sequence being varied to correspond with the variations in patterns to be woven.

A further object of my invention is to provide an indicator having a removable dial, which dial may be divided into angular and radial spaces, and in which spaces are indicia indicating the specific pedals to be operated and the sequence of their respective operations to produce a predetermined woven pattern.

Another object of my invention is to provide such a removable dial which may carry a small or large variety of indicia on its faces to assist the operator in producing a small or large variety of patterns to be woven as determined by the operator and which dial may be reversible for this purpose.

A further object of my invention is to provide a removable dial of the character described and which may be of suitable material, such as paper, and stored away for future use, and, if inscribed in pencil, may have its indicia erased and thus adapted for inscribing new indicia thereon.

A still further object of my invention is to provide an indicator of the character described, with hooks adapted to be easily detachably supported over the top castle of the loom.

The above and other objects of my invention will be revealed as the specification proceeds.

Figure 1:
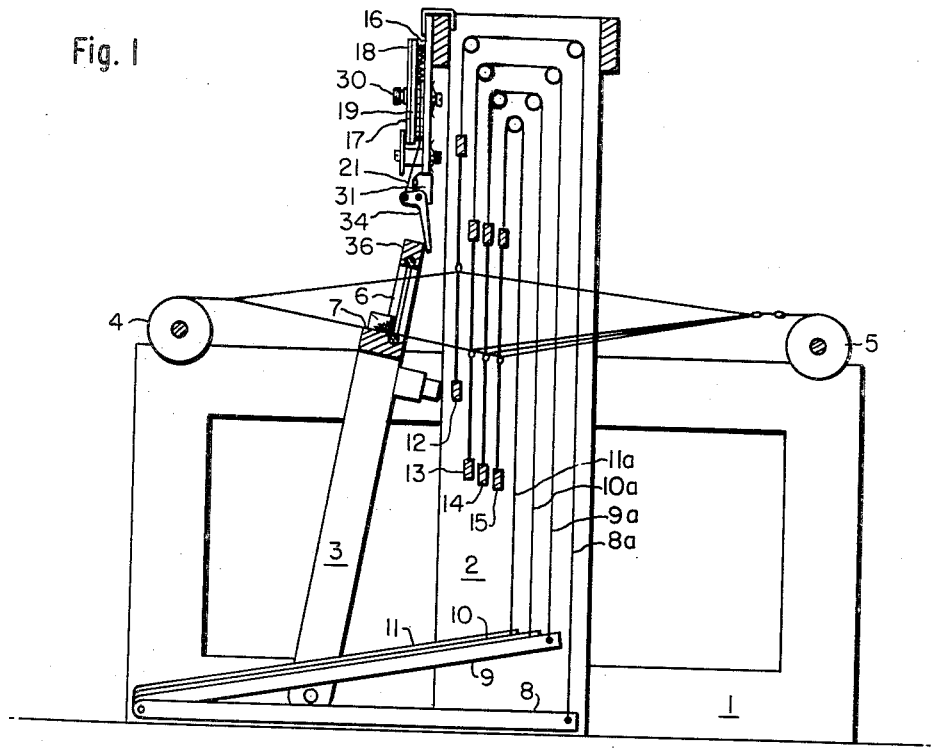
Figure 4:
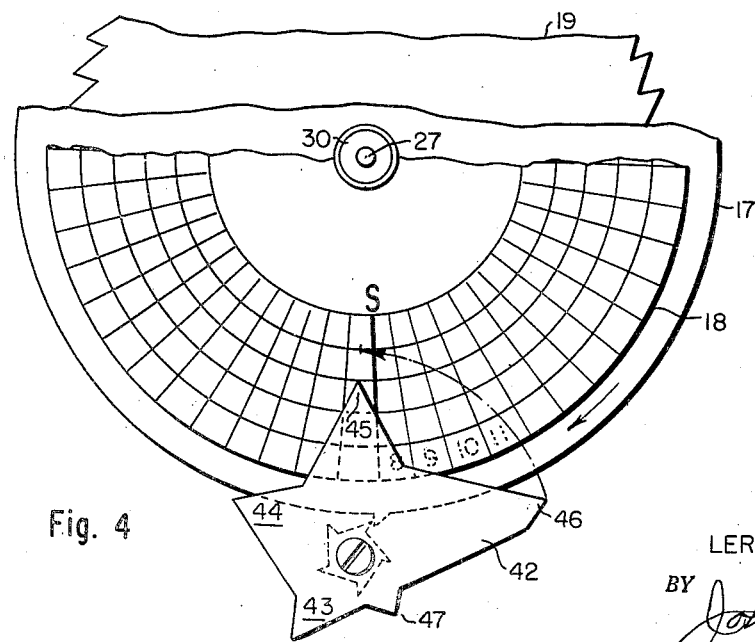
Figure 2:
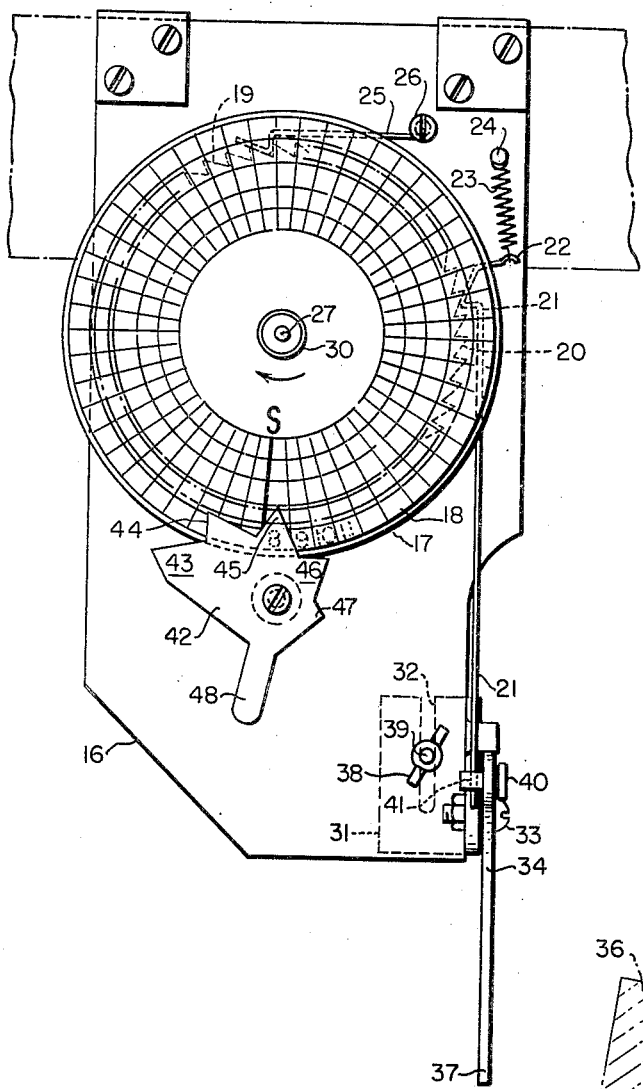
Figure 3:
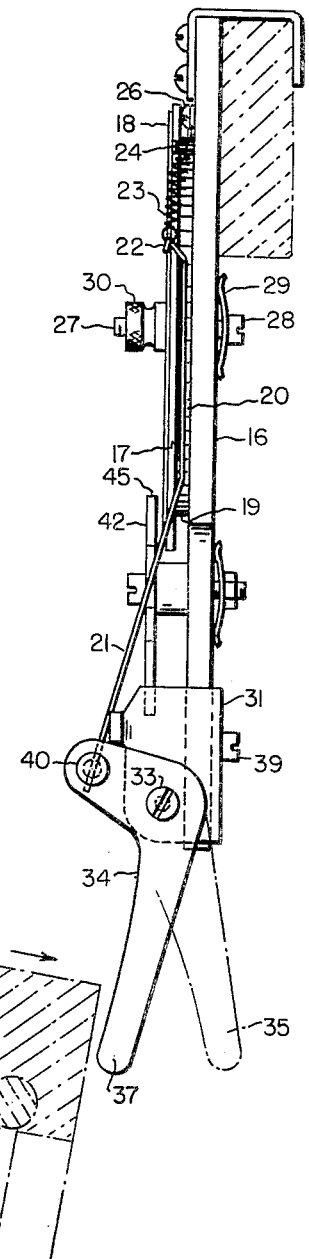

In the accompanying drawings, Figure 1 is a diagrammatic sectional right elevation of a hand loom to which the indicator of my invention is applied; Fig. 2 is a front elevation of the indicator and its cooperatively related operating parts; Fig. 3 is a right elevation thereof, and Fig. 4 is a fragmentary front elevation of an alternative form having an automatically advanced pointer.

Referring more specifically to the drawings, 1 represents the base upon which the loom rests. To the base 1, is rigidly secured a center upright 2. Pivotally secured to the base is a beater 3. The usual front beam 4 and back beam 5 are carried in the frame of the loom, and a reed 6 is provided on the top of beater 3; also, on the top of beater 3 is a suitable shuttle race 7 on which is thrown a shuttle. Pedals 8, 9, 10 and 11 are connected to harnesses 12, 13, 14 and 15 by flexible connections 8a, 9a, 10a and 11a respectively. However, these connections may be made by suitably actuated regid levers if desired, such as are illustrated in the above-mentioned copending patent application. The number of pedals and harnesses employed may be varied, as desired, within the specifications of the loom.

The indicator unit itself is suitably mounted on a panel board 16, and is comprised of a face-plate 17, a removable dial 18, of paper or other suitable material and a ratchet plate 19 attached to face plate 17. This ratchet plate has 50 ratchet teeth (part 20) formed in its circumferential periphery, as best illustrated in dotted lines, Fig. 2. Engaging these teeth, as also best illustrated in Fig. 2, is a pawl 21, an end of which, extending beyond the dial, is bent to form a notch 22. A coil spring 23, or other equivalent means, such as a rubber band, is secured at one end by a stud 24 in the panel board 16. The pawl 21 and retracting spring 23 are shown in normal position in Fig. 2. A flat tooth-locking pawl 25 is held in normal locking engagement with the ratchet teeth by means of a stud or screw 26. This locking pawl 25 prevents the dial from reversing counterclockwise when pawl 21 moves upward to engage another tooth of the ratchet.

The indicator is assembled by securing together on panel 16, the face plate 17, dial 18, and ratchet plate 19, by means of a threaded stud 27 (Fig. 3), extending through the above-mentioned parts and through the panel. The stud 27 is provided with a head 28 on its end extending through the back of the panel, and between said head 28 and the back wall of panel 16 is a flat-spring 29. When the above-mentioned parts 17, 18 and 19 have been assembled in place a suitable thumb-nut 30 on the front end of stud 27 is tightened against the dial face to hold the removable dial in position.

At the lower end of panel 16 is an adjustable bracket-block 31, mounted on the back of said panel, and adjustable in slot 32, Fig. 2. Attached to the bracket-block 31 by means of a pivot 33 is a lever 34, adapted to be moved into the dotted line position 35 when the crosspiece 36 of beater 3 strikes end 37 of lever 34 during the final backward movement of beater 3. Because of the different location of the beater on different looms bracket-block 31 may be adjusted by means of a wing-nut 38 on stud 39, to compensate for the above-mentioned varying position of the beater. A stud 40, on the lever 34, is provided with a hole 41 therethrough for receiving the lower end of pawl 21.

Below the face plate 17 is a pointer 42. This pointer has a predetermined number of indicating figures, 43, 44, 45, 46 and 47, Figs. 2 and 4 of the drawings. In the specific instance illustrated in the drawings, the pointer 42 (Fig. 4) may be automatically operated, or the modification, shown in Fig. 2, may be hand-operated by a handle 48, extending below the main body of the pointer 42.

The operation of my invention is as follows:

Prior to weaving, the operator marks the dial with the indicia in the sequence of the pedals to be depressed to raise certain harnesses or combinations of harnesses, it being understood, as hereinbefore described in the specification, that either a single harness or a combination of harnesses may be operated by one pedal. The sequence of pedal operations thus marked on the dial corresponds with the predetermined sequence supplied by the originator or publisher of the pattern to be woven.

In operation, the operator first reads the indicia on dial 18, to the right of starting point S on the outer circular path which might be the number 8 (behind pointer 42, Fig. 2) in order to raise the harness or harnesses connected to that pedal. In the specific case illustrated in Fig. 1, depression of pedal 8, would raise harness 12, as this harness is connected to pedal 8, by means of flexible connection 8a. The shuttle is then thrown across in front of the reed carrying the weft thread, the beater 3 is pulled forward and then back to its original position, at which point it operates lever 34 and thus advancing dial 18, in a clockwise direction, to the next indicia which may be 9. Now pedal 9 is depressed and the operations are repeated in the sequence noted by the indicia in each position on dial 18, as the latter rotates clockwise until the pattern is completed.

While on the drawings, for ease of description of the various loom parts, the indicia on the dial begins with the digits 8, 9, 10, 11, etc., corresponding to the pedals shown in said drawings it will be understood that, for simplicity of operation, in actual practice, the digits on the dial to the right of starting point S may be inscribed as 1, 2, 3, 4, etc. and the pedals correspondingly identified.

The indicia on dial 18, indicating pedal sequence is continued on said dial until the last shot of the pattern.

As the pattern is usually repeated a given number of times, after the completion of each pattern the dial 18, plate 17 and ratchet plate 19 are rotated together by hand in a clockwise direction to S to start the next pattern.

When the device of my invention is used for threading the heddles, dial 18 is first marked with indicia corresponding to harness numbers of heddles to be threaded in the sequence indicated by the originator or publisher of the pattern to be woven.

A common pattern calls for a threading sequence of 1-2-3-4-3-2-1 repeated. In this case dial 18 will be previously marked in this manner, starting from zero and progressing counterclockwise.

At the start, the first heddle in number 1 harness is threaded and lever 34 is operated to advance dial 18 to show the next succeeding digit on the dial.

The first heddle in the next harness is then threaded, the dial advanced to show the next digit on the dial, etc. until all the heddles in all the harnesses are threaded and all the warp threads thus prepared for weaving.

The particular advantage of the reversibility of the dial is that one side may be marked with indicia for threading a particular pattern, and the other side marked with indicia for the weaving or the pedal sequence required for that pattern.

What I claim as new and desire to secure by Letters Patent of the United States is:

1. An indicator for hand looms for weaving comprising a panel board, an indicating dial thereon having indicia on its face for indicating sequence of operations of the essential loom parts to reproduce a predetermined pattern, ratchet means also mounted on the panel board and cooperating with the dial to progressively rotate the latter in a clockwise direction, a pointer also mounted on the panel in cooperative indicating relation with the dial, a bracket-block, a lever pivoted on the bracket-block and adapted to be oscillated about said pivot, a ratchet operating pawl secured at one end to the pivoted lever on the bracket-block and the other end of which pawl actuates the dial, suitable locking means for securing the dial and ratchet to the panel board, means for securing the bracket-block to the panel, and means on the bracket-block for adjusting the vertical position of the bracket-block on the panel board and for securing said bracket in a predetermined position thereon.

2. An indicator for a hand loom for weaving said loom having a loom beater comprising a top crosspiece for the latter, a panel board for the indicator, an indicating dial on the panel board having indicia on the face of said dial for indicating sequence of operations of the essential loom parts to reproduce a predetermined pattern, ratchet means also mounted on the panel board and cooperating with the dial to progressively rotate the latter in a clockwise direction, a pointer also mounted on the panel in cooperative indicating relation with the dial, a bracket block on the panel, a lever pivoted on the bracket block and adapted to be oscillated about said pivot, a ratchet operating pawl secured at one end to the pivoted lever on the bracket block and the other end of which pawl is in actuating engagement with the dial, suitable locking means for securing the dial and ratchet to the panel board, means for securing the bracket block to the panel board, and means for adjusting and securing the position of the lever with respect to the top crosspiece of the loom.

References Cited in the file of this patent

UNITED STATES PATENTS

| 433,205 | Jones et al. | July 29, 1890 |
| 2,251,021 | Nebergall | July 29, 1941 |